United States Patent
Wei et al.

(10) Patent No.: US 9,311,471 B2
(45) Date of Patent: Apr. 12, 2016

(54) SHARING USB KEY BY MULTIPLE VIRTUAL MACHINES LOCATED AT DIFFERENT HOSTS

(71) Applicant: INTERNATIONAL BUSINESS MACHINES CORPORATION, Armonk, NY (US)

(72) Inventors: Lijun Wei, Beijing (CN); Binqi Zhang, Shanghai (CN); Qian Zhang, Beijing (CN); Qing Hong Zhuang, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 155 days.

(21) Appl. No.: 14/306,819

(22) Filed: Jun. 17, 2014

(65) Prior Publication Data

US 2014/0380310 A1    Dec. 25, 2014

(30) Foreign Application Priority Data

Jun. 25, 2013    (CN) .......................... 2013 1 0256168

(51) Int. Cl.
    *G06F 9/455*    (2006.01)
    *G06F 21/34*    (2013.01)
    *G06F 21/00*    (2013.01)

(52) U.S. Cl.
    CPC ............ *G06F 21/34* (2013.01); *G06F 9/45558* (2013.01); *G06F 21/00* (2013.01); *G06F 2009/45595* (2013.01)

(58) Field of Classification Search
    CPC ................ G06F 21/00; G06F 9/45558; G06F 2009/45595; G06F 21/34
    See application file for complete search history.

(56) References Cited

U.S. PATENT DOCUMENTS

| | | | |
|---|---|---|---|
| 5,991,546 A * | 11/1999 | Chan ..................... | G06F 13/385 710/313 |
| 8,166,211 B2 * | 4/2012 | Cota-Robles ........... | G06F 9/468 710/15 |
| 8,332,846 B2 * | 12/2012 | Astrand ............... | G06F 9/4413 710/72 |
| 9,158,912 B2 * | 10/2015 | Kettler .................... | G06F 21/10 |
| 2007/0043928 A1 | 2/2007 | Panesar et al. | |

(Continued)

OTHER PUBLICATIONS

Anonymous, "A Method of Sharing USB Key Among Virtual Machines," IPCOM000223238D, Nov. 13, 2012, pp. 1-4.

*Primary Examiner* — Jung Kim
*Assistant Examiner* — James J Wilcox
(74) *Attorney, Agent, or Firm* — Steven Chiu, Esq.; Blanche E. Schiller, Esq.; Heslin Rothenberg Farley & Mesiti P.C.

(57) ABSTRACT

A system for sharing a USB Key by multiple virtual machines located at different hosts including at least two virtual machine managers, each virtual machine manager including a virtual machine transceiver module which is configured to receive a request for accessing a USB Key from a virtual machine within its host; a storage module which is configured to store an association relationship between a USB Key and the virtual machine authenticated by the USB Key; a verification module which is configured to, in response to judging that the virtual machine of the received request can access the USB Key, transmit the request for accessing the USB Key to a USB Key transceiver module of a virtual machine manager of the host where the USB Key is located; and a USB Key transceiver module which is configured to receive a request for accessing a USB Key, and to transmit an access request to a connected USB Key.

20 Claims, 3 Drawing Sheets

(56) References Cited

U.S. PATENT DOCUMENTS

| | | | |
|---|---|---|---|
| 2009/0006690 A1* | 1/2009 | Vembu | G06F 13/10 710/113 |
| 2009/0006702 A1 | 1/2009 | Sarangdhar et al. | |
| 2009/0204965 A1 | 8/2009 | Tanaka et al. | |
| 2010/0031255 A1* | 2/2010 | Huber | G06F 8/61 718/1 |
| 2011/0107003 A1* | 5/2011 | Kang | G06F 13/42 710/313 |
| 2011/0246778 A1 | 10/2011 | Duane | |
| 2011/0295999 A1* | 12/2011 | Ferris | G06F 9/5072 709/224 |
| 2011/0302330 A1* | 12/2011 | Cota-Robles | G06F 9/468 710/14 |
| 2012/0216191 A1* | 8/2012 | Tsai | G06F 9/45558 718/1 |
| 2014/0101754 A1* | 4/2014 | McKenzie | G06F 21/83 726/19 |
| 2014/0380310 A1* | 12/2014 | Wei | G06F 9/45558 718/1 |
| 2015/0220467 A1* | 8/2015 | Jin | H04L 69/16 710/18 |

* cited by examiner

SHARING USB KEY BY MULTIPLE VIRTUAL MACHINES LOCATED AT DIFFERENT HOSTS

PRIOR FOREIGN APPLICATION

This application claims priority from Chinese patent application number 201310256168.4, filed Jun. 25, 2013, which is hereby incorporated herein by reference in its entirety.

BACKGROUND

One or more aspects relate to the field of virtual machines, and more specifically, to sharing a USB Key by multiple virtual machines located at different hosts.

A USB Key is a kind of hardware device used for authentication and with a USB interface, which has a built-in smart chip, and can store a secret key and a digital certificate of a user. By using a built-in cryptographic algorithm, the encryption and decryption, as well as digital signature and verification, can be carried out, so that the verification of the user's identity is realized, and the confidentiality and integrity of information, the authenticity of the identity, and the undeniability of the signature information are assured, thereby securing the security of the system application.

Virtual machines are widely used in large-scale economic organizations, such as banks, stock exchanges, insurance companies and the like. At present, it is possible to use a USB Key to authenticate that a host is a legal user to authorize it for use, or to authenticate that a virtual machine on the host is a legal user to authorize he/she for use.

In the prior art, one USB Key can only be used for one host, and only the virtual machines on the host can use the USB Key to carry out authentication while other hosts can not share the USB Key. In this way, multiple USB Keys are required to correspond to multiple hosts in the above application, causing the waste of the hardware cost.

BRIEF SUMMARY

In one or more aspects, sharing a USB Key by multiple virtual machines located at different hosts is provided.

According to one aspect of the present disclosure, there is provided a system for sharing a USB Key by multiple virtual machines located at different hosts, comprising: at least two virtual machine managers capable of communicating via a network, the at least two virtual machine managers being located at different hosts and managing respectively at least one virtual machine within their respective hosts, each of the virtual machine managers comprising: a virtual machine transceiver module which is configured to receive a request for accessing a USB Key from a virtual machine within its host; a storage module which is configured to store an association relationship between a USB Key and the virtual machine authenticated by the USB Key; a verification module which is configured to, in response to judging that the virtual machine of the received request for accessing a USB key can access the USB Key, transmit the request for accessing the USB Key to a USB Key transceiver module of a virtual machine manager of the host where the USB Key is located, according to the association relationship between the USB Key and the virtual machine authenticated by the USB Key stored by the storage module; and a USB Key transceiver module which is configured to receive a request for accessing a USB Key transmitted by the verification module of other virtual machine managers within the system for sharing a USB Key by multiple virtual machines located at different hosts, and to transmit an access request to a connected USB Key.

According to another aspect of the present invention, there is provided a method for sharing a USB Key by multiple virtual machines located at different hosts, wherein among at least two virtual machine managers capable of communicating via a network, a first virtual machine manager is located within a first host and manages at least one virtual machine within the first host, and a second virtual machine manager is located within a second host, manages at least one virtual machine within the second host, and controls the communication of a USB Key connected to the second host, the method comprising: receiving, by the first virtual machine manager, a request for accessing the USB Key from a virtual machine within the first host, wherein the association relationship between the USB Key and a virtual machine authenticated by the USB Key is stored in the first virtual machine manager; in response to judging that the virtual machine of the received request for accessing the USB key can access the USB Key, transmitting, by the first virtual machine manager, the request for accessing the USB Key to the second virtual machine manager of the second host where the USB Key is located, according to the stored association relationship between the USB Key and the virtual machine authenticated by the USB Key; and receiving, by the second virtual machine manager of the second host, the request for accessing the USB Key transmitted by the first virtual machine manager, and transmitting an access request to the connected USB Key.

According to one or more aspects of the present disclosure, it is possible to make one USB Key that is shared by the virtual machines on multiple hosts so as to achieve a purpose of saving resources.

BRIEF DESCRIPTION OF THE SEVERAL VIEWS OF THE DRAWINGS

Through the more detailed description of exemplary embodiments of the present disclosure in combination with the accompanying drawings, the above and other objects, features and advantages of the present disclosure will become more apparent, wherein the same reference numbers generally refer to the same components in the exemplary embodiments of the present disclosure.

DETAILED DESCRIPTION

Figure 1:
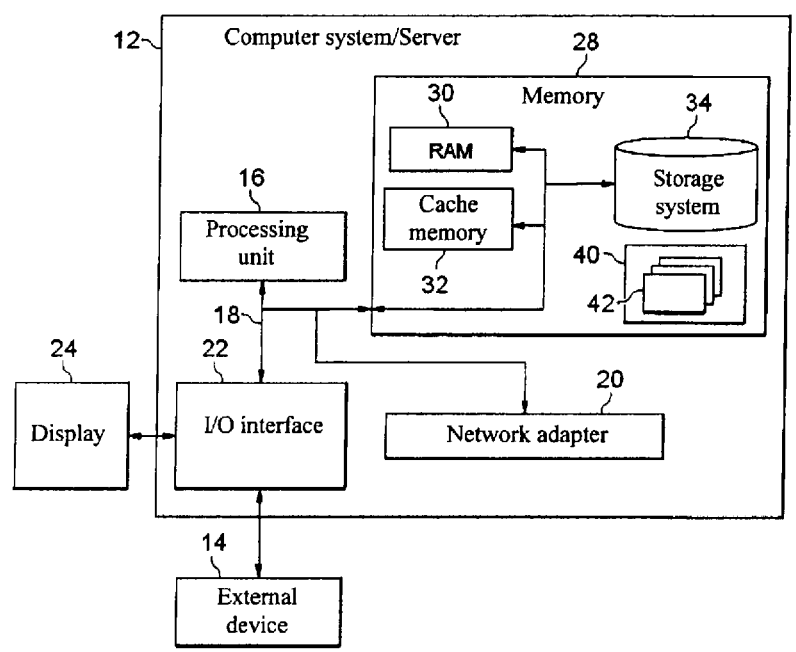
FIG. 1 shows a block diagram of an exemplary computer system/server 12 which is able to implement the embodiments of the present disclosure.

Some embodiments will be described in more detail with reference to the accompanying drawings, in which the embodiments of the present disclosure have been illustrated. However, one or more aspects of the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a virtual machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring now to FIG. 1, in which an exemplary computer system/server 12 which is able to implement the embodiments of the present disclosure is shown. Computer system/server 12 is only illustrative and is not intended to suggest any limitation as to the scope of use or functionality of embodiments of the disclosure described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 and processor 16.

Bus 18 represents one or more of several types of bus structures, including a memory bus or memory controller, a peripheral bus, an accelerated graphics port, and a processor, or uses a local bus using any of a variety of bus architectures. By way of example, such architectures include, but are not limited to, Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available medium that is accessible by computer system/server 12, including volatile and non-volatile medium, removable and non-removable medium.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for accessing a non-removable, non-volatile magnetic medium (not shown and typically referred to as a "hard drive"). Although not shown in FIG. 1, a magnetic disk drive for accessing a removable, non-volatile magnetic disk (e.g., a "floppy disk"), and an optical disk drive for accessing a removable, non-volatile optical disk such as a CD-ROM, DVD-ROM or other optical media can be provided. In such instances, each drive can be connected to bus 18 by one or more data medium interfaces. Memory 28 can include at least one program product having a set of (e.g., at least one) program modules that are configured to carry out the functions of embodiments of the disclosure.

Program/utility 40 having a set of (at least one) program modules 42 may be stored in for example memory 28. Such program modules 42 include, but are not limited to, an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the disclosure as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

In the following, the method and system for sharing a USB Key by multiple virtual machines located at different hosts according to embodiments of the present disclosure will be described by reference to the attached drawings.

Figure 2:
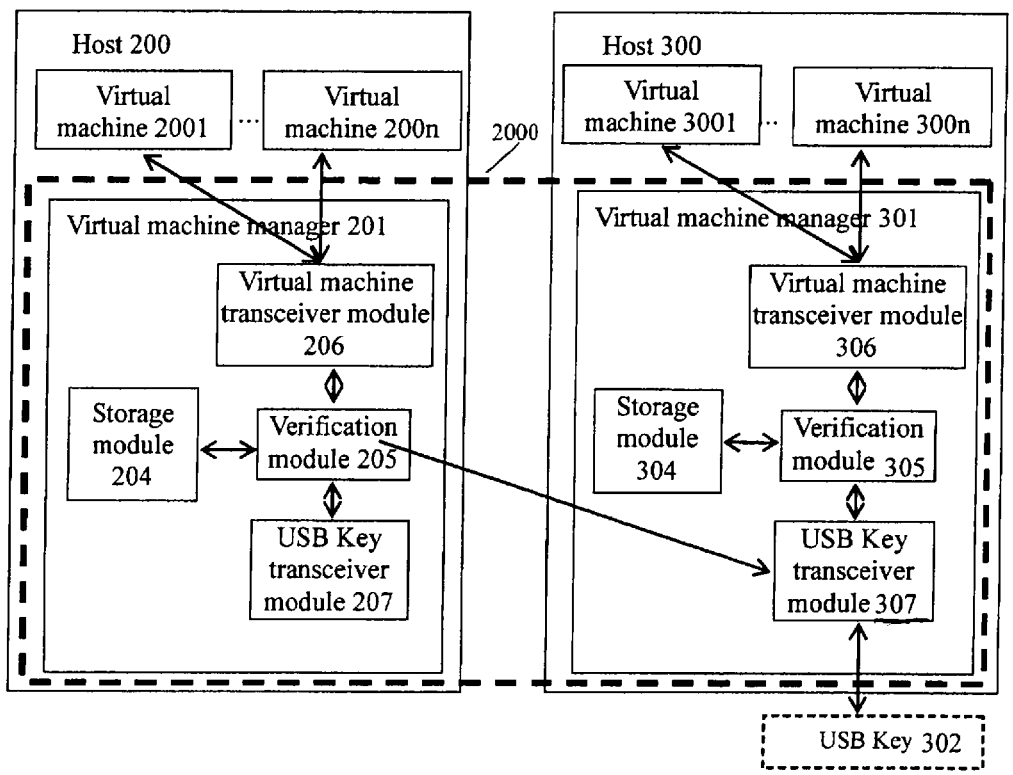
FIG. 2 schematically shows a structural block diagram of a system for sharing a USB Key by multiple virtual machines located at different hosts according to one embodiment of the present disclosure.

FIG. 2 schematically shows a structural block diagram of a system 2000 for sharing a USB Key by multiple virtual machines located at different hosts according to one embodiment of the present disclosure. According to FIG. 2, within the dashed box in FIG. 2 is the system 2000 including at least two virtual machine managers capable of communicating via a network, in which the at least two virtual machine managers are located within different hosts and manage respectively at least one virtual machine within the respective host to which the virtual machine managers belong. For example, a first virtual machine manager 201 in FIG. 2 is located within a first host 200 and is configured to manage at least one virtual machine within the first host 200, that is, a virtual machine 2001, . . . , a virtual machine 200*n*. A second virtual machine manager 301 is located within a second host 300 and is configured to manage at least one virtual machine within the second host 300, that is, a virtual machine 3001, . . . , a virtual machine 300*n*, and to control the communication of a USB Key (302) connected to the second host.

In one implementation, the virtual manager (201, 301) includes a storage module (204, 304) which is configured to store the association relationship between a USB Key and the virtual machine authenticated by the USB Key. In one implementation, a USB Key configuration table can be employed to record the association relationship between the USB Key for authentication and the virtual machine authenticated by the USB Key. For example, Table 1 shows one kind of USB Key configuration table.

TABLE 1

USB Key Configuration Table

| Unique identification number for a USB Key | List of virtual machines on a host which are using the USB Key | Identifier for the host where the USB Key is located |
|---|---|---|
| . . . | . . . | . . . |

The unique identification number for a USB Key is used for identifying a USB Key in a case that multiple virtual machines are authenticated by using different USB Keys. A list of virtual machines on a host which are using the USB Key is used to represent a set of unique identification codes for the virtual machines which are being authenticated by using the USB Key. The identifier for the host where the USB Key is located is used to indicate the host where the USB Key is, and, as examples, can be the name of the host, an IP address of the host, or other identifications for uniquely identifying the host. It is appreciated by those skilled in the art that the association relationship between a USB Key and the virtual machine authenticated by the USB Key as described above may also be expressed by using other data structures, such as an array, a HASH table and the like, and details thereof will not be given herein. For the convenience of description, one or more aspects of the present application subsequently uses a USB Key configuration table to represent the association relationship between a USB Key and the virtual machine authenticated by the USB Key. The association relationship between a USB Key and the virtual machine authenticated by the USB Key may be established when the virtual machine is established, or may be input manually by a system administrator, or may be imported via a network or a storage device.

In one implementation, the above association relationship between a USB Key and the virtual machine authenticated by the USB Key stored in the storage module may include the association relationship between all the USB Keys managed by the system 2000 and the virtual machines authenticated by the USB Keys, that is to say, USB Key configuration tables stored in the storage modules of respective virtual machine managers within the system 2000 are the same, which are referred to as a global USB Key configuration table hereinafter. When any one of the storage modules updates the USB Key configuration table stored therein, all of the USB Key configuration tables in the storage modules of other virtual machine managers should be synchronized.

In another implementation, the storage module of the virtual machine manager of each host only stores the association relationship between the USB Key associated with the virtual machine manager of its own host and the virtual machine authenticated by the USB Key. For example, the USB Key configuration table stored in the storage module 204 includes the association relationship between the USB Keys associated with the virtual machine 2001, . . . , 200*n* and the virtual machines authenticated by the USB Keys, but does not include the association relationship between the USB Keys associated with the virtual machine 3001, . . . , 300*n* and the virtual machines authenticated by the USB Keys. The USB Keys associated with the virtual machines 2001, . . . , 200*n* may not be connected to the host 200. The USB Key configuration table stored in the storage module 304 includes the association relationship between the USB Keys associated with the virtual machine 3001, . . . , 300n and the virtual machines authenticated by the USB Keys, and herein the USB Keys associated with the virtual machines 3001, . . . , 300n may not be connected to the host 300 either. It is referred to as a local USB Key configuration table hereinafter. In such a case, when one storage module updates the USB Key configuration table stored therein, the associated virtual machine manager should accordingly update the USB Key configuration table stored in the storage module thereof.

In one implementation, after the storage module stores the association relationship between a USB Key for authentication and the virtual machine authenticated by the USB Key, each of the virtual machine managers (201, 301) further includes: a virtual machine transceiver module (206, 306) which is configured to receive a request for accessing a USB Key from the virtual machine to which it belongs; a verification module (205, 305) which is configured to, in response to judging that the virtual machine of the received request for accessing the USB Key can access the USB Key, transmit the request for accessing the USB Key to a USB Key transceiver module of a virtual machine manager of the host where the USB Key is located, according to the association relationship between the USB Key and the virtual machine authenticated by the USB Key stored in the storage module; and a USB Key transceiver module (207, 307) which is configured to receive a request for accessing a USB Key transmitted by the verification module of any virtual machine manager within the system 2000 for sharing a USB Key by multiple virtual machines located as different hosts, and to transmit an access request to a connected USB Key. For example, in FIG. 2, the virtual machine transceiver module (206) of the first virtual machine manager (201) receives a request for accessing the USB Key 302 from the virtual machine 2001 within the first host. The storage module (204) within the first virtual machine manager (201) stores the association relationship between the USB Key and the virtual machine authenticated by the USB Key. The verification module (205) of the first virtual machine manager (201) judges that the virtual machine 2001 of the received request for accessing the USB Key 302 can access the USB Key 302 according to the association relationship between the USB Key and the virtual machine authenticated by the USB Key stored in the storage module, and transmits the request for accessing the USB Key 302 to the USB Key transceiver module (307) of the second virtual machine manager (301) of the second host where the USB Key 302 is located. The USB Key transceiver module (307) of the second virtual machine manager (301) of the second host (300) receives the request for accessing the USB Key 302 transmitted by the verification module (205) of the first virtual machine manager (201), and transmits an access request to the connected USB Key 302.

Herein, with respect to the technique that a virtual machine on a host can access the USB Key connected to the host in the prior art, no change may need to be made, but the list of these virtual machines is simply not added to the USB Key configuration table. Alternatively, it is also possible to incorporate the prior art into an implementation of the present disclosure, and it is added to the USB Key configuration table that a virtual machine on a host can access the USB Key connected to the host, so that the authentication and access for all of the USB Keys are controlled by the virtual machines.

In one embodiment, the verification module (205, 305) is further configured to, in response to judging that the virtual machine of the received request for accessing a USB Key can not access the USB Key, reply that the virtual machine has no access right, according to the association relationship between the USB Key and the virtual machine authenticated by the USB Key stored in the storage module.

In one example, it is assumed that the system employs a global USB Key configuration table as shown in Table 2.

TABLE 2

Exemplary USB Key Configuration Table

| Unique identification number for a USB Key | List of virtual machines on a host which are using the USB Key | Identifier for the host where the USB Key is located |
|---|---|---|
| XXX-YYY-USB-KEY-1 | 2001, 3001 | 300 |

At this time, the virtual machine 2001 wants to access a USB Key with a unique identification number of XXX-YYY-USB-KEY-1, and transmits an access request to the virtual machine transceiver module 206 of the virtual machine manager 201. The virtual machine transceiver module 206 forwards the request to the verification module 205. The verification module 205 queries the USB Key configuration table of the storage module with the identification 2001 of the virtual machine, and finds that the virtual machine 2001 can access the USB Key and obtains that the identifier for the host where the USB Key is located is 300, and then transmits a request for accessing the USB Key to the USB Key transceiver module 307 of the virtual machine manager 301 of the host 300. After receiving the request, the USB Key transceiver module 307 confirms that it is transmitted by the verification module 205 of the virtual machine manager 201, and then transmits an access request to the inserted USB Key with a unique identification number of XXX-YYY-USB-KEY-1. Similarly, if it is a local USB Key configuration table, the above Table 2 will be stored in the storage module 204 of the virtual machine manager 201, and the verification procedure is the same as that of employing a global USB Key configuration table. In this way, a virtual machine of the host 200 can access a USB Key inserted into the host 300, so that it may be realized that a same USB Key is shared by virtual machines of multiple hosts.

In one implementation, the USB Key transceiver module (207, 307) is further configured to receive the authentication information of a USB Key, and the virtual machine transceiver module (206, 306) is further configured to transmit the received authentication information of the USB Key to the virtual machine which is determined to be able to access the USB Key by the verification module.

The various implementations as described above are directed to a system for sharing a USB Key mainly with respect to an already established virtual machine accessing a USB Key of a different host for authentication. For a newly established virtual machine, in addition to the unique identification number for a USB Key, a list of virtual machines on a host which are using the USB Key, and the identifier for the host where the USB Key is located, there is included the maximum number of virtual machines for which the USB Key is allowed to be used in the stored association relationship between the USB Key for authentication and the virtual machine authenticated by the USB Key. The corresponding USB Key configuration table used when a newly established virtual machine is included is shown as Table 3.

TABLE 3

USB Key Configuration Table used when a newly
established virtual machine is included

| Unique identification number for a USB Key | List of virtual machines on a host which are using the USB Key | Identifier for a host where the USB Key is located | Maximum number of virtual machines for which the USB Key is allowed to be used |
|---|---|---|---|
| ... | ... | ... | |

In the implementation corresponding to the USB Key configuration table as shown in Table 3, the virtual machine manager in FIG. 2 should further include a newly-established virtual machine authentication module (not shown in FIG. 2) which is configured to, in response to newly establishing a virtual machine in a host, confirm whether the USB key has an excess authentication according to the unique identification number for the USB Key, the list of virtual machines on a host which are using the USB Key, and the maximum number of virtual machines for which the USB Key is allowed to be used, and to add a unique identification code for the newly established virtual machine to the list of virtual machines on a host which are using the USB Key in response to having an excess authentication. In this way, the newly established virtual machine may be authenticated using a system in which a USB Key is shared by already established virtual machines.

In the same way, when a virtual machine is no longer authenticated by using a USB Key, for example, when the virtual machine is shut down, offline or deleted, an authentication may be released and authorized to other virtual machines. That is, when corresponding to Table 3, the unique identification code for the virtual machine is deleted from the list of virtual machines on a host which are using the USB Key in the USB Key configuration table.

In one implementation, the virtual machine transceiver module (206, 306) is further configured to receive requests for accessing a USB Key from multiple virtual machines, to queue the multiple requests, and to transmit them to the verification module in turn. In a further implementation, the multiple requests include request importance levels of the virtual machines, and the multiple requests are queued in accordance with the request importance levels of the virtual machines and transmitted to the verification module in turn. That is to say, a request with the highest importance level is preferentially transmitted to the USB Key. For example, when bank users are served, requests requiring authentication by a USB Key may be provided with different importance levels in accordance with conditions such as the rank of users, whether it is a foreign currency transaction, whether the amount of money is large, and the like, and then the multiple requests are queued in accordance with the request importance levels of virtual machines and transmitted to the verification module in turn.

On the other hand, when a virtual machine is migrated, the issue of USB Key authentication should also be considered, so that no repetitive authentication is needed. The migration of a virtual machine means that a virtual machine system running on a VMM (Virtual Machine Monitor) can be migrated to other physical hosts to run thereon. The migration technology makes a virtual machine be able to be transferred dynamically between different hosts without interrupting the execution of the virtual machine. The procedure of migration is as follows. First, a service is running on a virtual machine of a source host. Then, when a target host has already obtained resources for the running of the virtual machine, through a short switching, the source host transfers the right of control to the target host, and the virtual machine can continue to run on the target host. There is generally employed a centralized shared external storage device such as SAN (Storage Area Network), NAS (Network-Attached Storage, which is a special network storage device) or the like between physical machines, and thus, it is only needed to carry out the migration of the internal memory execution state within the virtual machine system when a virtual machine is migrated, thereby a better migration performance is achieved.

However, there is still no related technology capable of addressing the problem of the USB Key authentication and authorization before and after a virtual machine is migrated at present. If some services of a virtual machine are based on the USB Key authentication and authorization, the original authentication and authorization will be invalid after the virtual machine is migrated because the migration of the virtual machine is based on the duplication of a hardware resource and structure but it is not possible to perform the same operation on a USB Key, so that the USB Key is still associated with the source host and still serves the virtual machine which is not migrated.

In such a case, the virtual machine manager of a new host may not be located in the system for sharing a USB Key by multiple virtual machines located at different hosts. At this time, the original virtual machine manager further includes a migration module which is configured to, in response to a virtual machine being migrated to a new host which is not located in the system for sharing a USB Key by multiple virtual machines located at different hosts, add the virtual machine manager of the new host to the system for sharing a USB Key by multiple virtual machines located at different hosts. Adding to the system for sharing a USB Key by multiple virtual machines located at different hosts includes adding all of the modules in respective virtual machine managers contained in the system to the virtual machine manager.

The case of virtual machine migration may employ the USB Key configuration table as shown in Table 1 or Table 3.

In one implementation, if a global USB Key configuration table is employed, adding by the migration module the virtual machine manager of the new host to the system for sharing a USB Key by multiple virtual machines located at different hosts includes synchronizing the stored global USB Key configuration table to the virtual machine manager of the new host in response to employing the global USB Key configuration table as the USB Key configuration table. If the new host to which the virtual machine is migrated has already been in the system for sharing a USB Key by multiple virtual machines located at different hosts, the association relationship between the USB Key and the virtual machine authenticated by the USB Key has been contained in the virtual machine manager of the new host, thus the migration module is not needed to carry out a synchronization operation. It is understood by those skilled in the art that an implementation of using a global USB Key configuration table to perform synchronization is simple, and no example is given herein.

In another implementation, adding by the migration module the virtual machine manager of the new host to the system for sharing a USB Key by multiple virtual machines located at different hosts includes: in response to employing a local USB Key configuration table as the USB Key configuration table, migrating the configuration correlated to the virtual machine in the stored local USB Key configuration table to the virtual machine manager of the new host. For example, the first virtual machine manager 201 on the first host 200 employs a local USB Key configuration table as shown in Table 4. If the virtual machine 2001 is migrated from the host 200 to the new host and the virtual machine manager of the new host is originally not in the system for sharing a USB Key by multiple virtual machines located at different hosts, the virtual machine manager of the new host is added to the system firstly, that is, respective modules, i.e. a virtual machine transceiver module, a storage module, a verification module, a USB Key transceiver module, a migration module and the like, and in one embodiment, including a newly-established virtual machine authentication module additionally, are created in the virtual machine manager. Then, the local USB Key configuration table as shown in Table 5 is stored in the storage module of the virtual machine manager of the new host, and the unique identification number 2001 for a virtual machine in the list of virtual machines on a host which are using the USB Key of Table 4 is deleted. In this way, the migration of a local USB Key configuration table is completed. The virtual machine after migration may employ the system as described above to access a USB Key to complete authentication.

TABLE 4

Local USB Key Configuration Table on the first virtual machine manager

| Unique identification number for a USB Key | List of virtual machines on a host which are using the USB Key | Identifier for a host where the USB Key is located |
|---|---|---|
| XXX-YYY-USB-KEY-1 | 2001, 2002, 2003 | 300 |

TABLE 5

Local USB Key Configuration Table on the third virtual machine manager

| Unique identification number for a USB Key | List of virtual machines on a host which are using the USB Key | Identifier for a host where the USB Key is located |
|---|---|---|
| XXX-YYY-USB-KEY-1 | 2001 | 300 |

Figure 3:
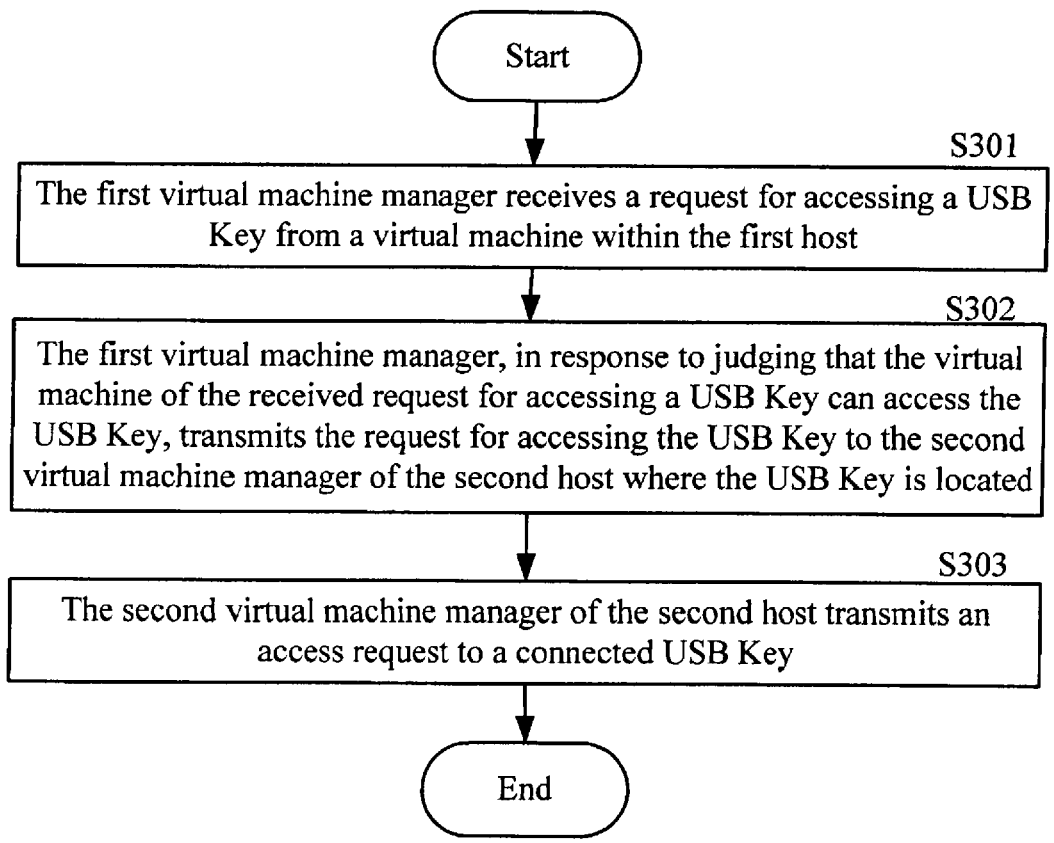
FIG. 3 schematically shows a flow of a method for sharing a USB Key by multiple virtual machines located at different hosts according to one embodiment of the present disclosure.

One or more aspects of the present application further disclose a method for sharing a USB Key by multiple virtual machines located at different hosts, in which among at least two virtual machine managers capable of communicating via a network, a first virtual machine manager is located within a first host and manages at least one virtual machine within the first host, and a second virtual machine manager is located within a second host, manages at least one virtual machine within the second host, and controls the communication of a USB Key connected to the second host. FIG. 3 schematically shows a flow of a method for sharing a USB Key by multiple virtual machines located at different hosts. According to FIG. 3, the method includes, for instance, the following steps. At step S301, the first virtual machine manager receives a request for accessing a USB Key from a virtual machine within the first host, and the association relationship between a USB Key and the virtual machine authenticated by the USB Key is stored within the first virtual machine manager. At step S302, the first virtual machine manager, in response to judging that the virtual machine of the received request for accessing the USB Key can access the USB Key, transmits the request for accessing the USB Key to the second virtual machine manager of the second host where the USB Key is located, according to the stored association relationship between a USB Key and the virtual machine authenticated by the USB Key. At step S303, the second virtual machine manager of the second host receives the request for accessing the USB Key transmitted by the first virtual machine manager and transmits an access request to the connected USB Key.

In the above method, the association relationship between a USB Key and the virtual machine authenticated by the USB Key is stored by using a USB Key configuration table whose items include, for example: a unique identification number for a USB Key for identifying a USB Key in a case that multiple virtual machines are authenticated by using different USB Keys; a list of virtual machines on a host which are using the USB Key for representing a set of unique identification codes for the virtual machines which are being authenticated by using the USB Key; and an identifier for the host where the USB Key is located for indicating the host where the USB Key is located. In one implementation, the association relationship between a USB Key and the virtual machine authenticated by the USB Key further includes the maximum number of the virtual machines for which the USB Key are allowed to be used.

In one implementation, the method further includes: in response to newly establishing a virtual machine in the first host, confirming whether the USB Key has an excess authentication according to the identification number for the USB Key, the list of virtual machines on a host which are using the USB Key, and the maximum number of the virtual machines for which the USB Key is allowed to be used stored within the second virtual machine manger, and adding the unique identification code for the virtual machine to the list of virtual machines on a host which are using the USB Key in response to having an excess authentication. Accordingly, the method further includes deleting the unique identification number for a USB Key from the list of the virtual machines on a host which are using the USB Key of the USB Key configuration table in response to the virtual machine being no longer authenticated by using the USB Key.

In another implementation, receiving by the first virtual machine manager a request for accessing a USB Key from a virtual machine within the first host includes, for instance: receiving by the first virtual machine manager requests for accessing a USB Key from multiple virtual machines within the first host, queuing the multiple requests and processing them in turn. In a further implementation, the multiple requests include request importance levels of the multiple virtual machines, and the multiple requests are queued in accordance with the request importance levels of the multiple virtual machines and processed in turn.

In a further implementation, the method includes: in response to migrating a virtual machine on the first host to a third host and there being no relationship of sharing a USB Key between at least one virtual machine managed by a third virtual machine manager of the third host and the virtual machines managed by the first and the second virtual machine managers, establishing a relationship of sharing a USB Key between the virtual machine managed by the third virtual machine manager of the third host and the virtual machines managed by the first and the second virtual machine mangers. In one embodiment, establishing a relationship of sharing a USB Key between the virtual machine managed by the third virtual machine manager of the third host and the virtual machines managed by the first and the second virtual machine mangers includes synchronizing a global USB Key configuration table stored by the virtual machine manager of the first host to the virtual machine manager of the third host in response to employing the global USB Key configuration table as the USB Key configuration table. In another implementation, establishing a relationship of sharing a USB Key between the virtual machine managed by the third virtual machine manager of the third host and the virtual machines managed by the first and the second virtual machine mangers includes migrating the configuration correlated to the virtual machine in a local USB Key configuration table stored by the virtual machine manager of the first host to the virtual machine manager of the third host in response to employing the local USB Key configuration table as the USB Key configuration table The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system of sharing a USB Key by a plurality of virtual machines located at different hosts, comprising:
    at least two virtual machine managers capable of communicating via a network, the at least two virtual machine managers being located at different hosts and managing respectively at least one virtual machine within their respective hosts, each of the virtual machine managers comprising:
        a virtual machine transceiver module which is configured to receive a request for accessing a USB Key from a virtual machine within its host;
        a storage module which is configured to store an association relationship between at least one USB Key and one or more virtual machines authenticated by the at least one USB Key;
        a verification module which is configured to, in response to judging that the virtual machine requesting access to the USB key can access the USB Key, transmit the request for accessing the USB Key to a USB Key transceiver module of a virtual machine manager of the host where the USB Key is located according to the association relationship stored by the storage module; and
        a USB Key transceiver module of the virtual machine manager of the host receiving the request which is configured to receive other requests for accessing other USB Keys transmitted by verification modules of other virtual machine managers within the system.

2. The system according to claim 1, wherein the association relationship is stored by using a USB Key configuration table, the USB Key configuration table comprising:
    a unique identification number for the USB Key, for identifying the USB Key in a case that a plurality of virtual machines are authenticated by using different USB Keys;
    a list of virtual machines on a host which are using the USB Key, for representing a set of unique identification codes for virtual machines which are being authenticated by using the USB Key; and
    an identifier for the host where the USB Key is located, for indicating the host where the USB Key is located.

3. The system according to claim 2, wherein the association relationship further comprises a maximum number of virtual machines for which the USB Key is allowed to be used.

4. The system according to claim 3, wherein each of the virtual machine managers further comprises a newly-established virtual machine authentication module which is configured to:
    in response to newly establishing a virtual machine in the host, confirm whether the USB key has an excess authentication according to the unique identification number for the USB Key, the list of virtual machines on the host which are using the USB Key, and the maximum number of virtual machines for which the USB Key is allowed to be used; and
    in response to having an excess authentication, add a unique identification code for the newly established virtual machine to the list of virtual machines which are using the USB Key.

5. The system according to claim 4, wherein each of the virtual machine managers further comprises a deleting virtual machine authentication module which is configured to delete the unique identification code for a virtual machine from the list of virtual machines which are using the USB Key of the USB Key configuration table in response to the virtual machine being no longer authenticated by using the USB Key.

6. The system according to claim 2, wherein each of the virtual machine managers further comprises a migration module which is configured to, in response to a virtual machine being migrated to a new host which is not located in the system, add a virtual machine manager of the new host to the system.

7. The system according to claim 6, wherein adding the virtual machine manager of the new host comprises, in response to employing a global USB Key configuration table as the USB Key configuration table, synchronizing the stored global USB Key configuration table to the virtual machine manager of the new host.

8. The system according to claim 6, wherein adding the virtual machine manager of the new host to the system comprises, in response to employing a local USB Key configuration table as the USB Key configuration table, migrating the configuration correlated to the virtual machine in the stored local USB Key configuration table to the virtual machine manager of the new host.

9. The system according to claim 1, wherein the virtual machine transceiver module is further configured to receive requests for accessing the USB Key from a plurality of virtual machines, to queue the plurality of requests, and to transmit them to the verification module in turn.

10. The system according to claim 9, wherein the plurality of requests comprise request importance levels of the virtual machines, and the plurality of requests are queued in accordance with the request importance levels of the virtual machines and transmitted to the verification module in turn.

11. A method for sharing a USB Key by a plurality of virtual machines located at different hosts, wherein a first virtual machine manager is located within a first host and manages at least one virtual machine within the first host, and a second virtual machine manager is located within a second host and manages at least one virtual machine within the second host, the method comprising:
  receiving, by the first virtual machine manager, a request for accessing a USB Key from a virtual machine within the first host, wherein an association relationship between at least one USB Key and one or more virtual machines authenticated by the at least one USB Key is stored in the first virtual machine manager;
  in response to judging that the virtual machine requesting access to the USB key can access the USB Key, transmitting, by the first virtual machine manager, the request for accessing the USB Key to the second virtual machine manager of the second host where the USB Key is located, according to the stored association relationship; and
  receiving, by the second virtual machine manager of the second host, the request for accessing the USB Key transmitted by the first virtual machine manager, and transmitting an access request to the USB Key connected to the second host.

12. The method according to claim 11, wherein the association relationship is stored by using a USB Key configuration table, the USB Key configuration table comprising:
  a unique identification number for the USB Key, for identifying the USB Key in a case that a plurality of virtual machines are authenticated by using different USB Keys;
  a list of virtual machines on a host which are using the USB Key, for representing a set of unique identification codes for virtual machines which are being authenticated by using the USB Key; and
  an identifier for the host where the USB Key is located, for indicating the host where the USB Key is located.

13. The method according to claim 12, wherein the association relationship further comprises a maximum number of virtual machines for which the USB Key is allowed to be used.

14. The method according to claim 12, wherein in response to a virtual machine on the first host being migrated to a third host and there being no relationship of sharing a USB Key between at least one virtual machine managed by a third virtual machine manager of the third host and the virtual machines managed by the first and the second virtual machine managers, a relationship of sharing a USB Key between the virtual machine managed by the third virtual machine manager of the third host and the virtual machines managed by the first and the second virtual machine mangers is established.

15. The method according to claim 14, wherein establishing the relationship of sharing a USB Key between the virtual machine managed by the third virtual machine manager of the third host and the virtual machines managed by the first and the second virtual machine mangers comprises, in response to employing a global USB Key configuration table as the USB Key configuration table, synchronizing the global USB Key configuration table stored by the virtual machine manager of the first host to the virtual machine manager of the third host.

16. The method according to claim 14, wherein establishing a relationship of sharing a USB Key between the virtual machine managed by the third virtual machine manager of the third host and the virtual machines managed by the first and the second virtual machine mangers comprises, in response to employing a local USB Key configuration table as the USB Key configuration table, migrating the configuration correlated to the virtual machine in the local USB Key configuration table stored by the virtual machine manager of the first host to the virtual machine manager of the third host.

17. The method according to claim 11, further comprising:
  in response to newly establishing a virtual machine in the first host, confirming whether the USB key has an excess authentication according to the unique identification number for the USB Key, the list of virtual machines on the host which are using the USB Key, and the maximum number of virtual machines for which the USB Key is allowed to be used; and
  in response to having an excess authentication, adding the unique identification code for the newly established virtual machine to the list of virtual machines which are using the USB Key.

18. The method according to claim 17, further comprising deleting the unique identification code for a virtual machine from the list of virtual machines which are using the USB Key of the USB Key configuration table in response to the virtual machine being no longer authenticated by using the USB Key.

19. The method according to claim 11, wherein receiving, by the first virtual machine manager, the request for accessing the USB Key from a virtual machine within the first host comprises receiving, by the first virtual machine manager, requests for accessing the USB Key from a plurality of virtual machines, queuing the plurality of requests, and processing them in turn, and wherein the plurality of requests comprise request importance levels of virtual machines, and the plurality of requests are queued in accordance with the request importance levels of the virtual machines and processed in turn.

20. A computer program product for sharing a USB Key by a plurality of virtual machines located at different hosts, wherein a first virtual machine manager is located within a first host and manages at least one virtual machine within the first host, and a second virtual machine manager is located within a second host and manages at least one virtual machine within the second host, the computer program product comprising:
  a non-transitory computer readable storage medium readable by a processing circuit and storing instructions for execution by the processing circuit for performing a method comprising:
  receiving, by the first virtual machine manager, a request for accessing a USB Key from a virtual machine within the first host, wherein an association relationship between at least one USB Key and one or more virtual machines authenticated by the at least one USB Key is stored in the first virtual machine manager;
  in response to judging that the virtual machine requesting access to the USB key can access the USB Key, transmitting, by the first virtual machine manager, the request for accessing the USB Key to the second virtual machine manager of the second host where the USB Key is located, according to the stored association relationship; and
  receiving, by the second virtual machine manager of the second host, the request for accessing the USB Key transmitted by the first virtual machine manager, and transmitting an access request to the USB Key connected to the second host.

* * * * *